United States Patent [19]

McDonnell et al.

[11] Patent Number: 4,934,255
[45] Date of Patent: Jun. 19, 1990

[54] FOOD TREATING APPARATUS AND METHOD

[75] Inventors: Gerald F. McDonnell, Virginia Beach, Va.; Tony L. Towns, Prattville, Ala.

[73] Assignee: Mobile Ripening Co., Inc., Virginia Beach, Va.

[21] Appl. No.: 190,897

[22] Filed: May 6, 1988

[51] Int. Cl.⁵ .............................................. B60P 3/20
[52] U.S. Cl. ................................. 98/6; 62/237; 98/52; 98/DIG. 7; 236/44 C
[58] Field of Search ................... 98/6, 52, DIG. 7; 165/16; 62/237; 236/44 C

[56] References Cited

U.S. PATENT DOCUMENTS

| | | | |
|---|---|---|---|
| 1,339,374 | 5/1920 | Buensod | 98/34.6 X |
| 1,501,660 | 7/1924 | Helmer | 236/44 C |
| 2,144,693 | 1/1939 | Seid | 236/44 C |
| 2,211,927 | 11/1940 | Reilly | 62/237 X |
| 2,778,206 | 1/1957 | Wilson et al. | 62/237 X |
| 2,895,309 | 7/1959 | Kutlmeier | 62/239 X |
| 3,092,220 | 6/1963 | Black | 98/6 X |
| 3,603,380 | 9/1971 | Corhanidis | 98/52 X |
| 4,050,365 | 9/1977 | Freeman, Jr. | 98/40.05 X |
| 4,118,209 | 11/1978 | Exler et al. | 62/176.5 |
| 4,143,588 | 3/1979 | Exler | 98/6 |
| 4,598,555 | 7/1986 | Wihdecker | 62/239 X |

FOREIGN PATENT DOCUMENTS 132849 10/1979 Japan ..................... 98/52

*Primary Examiner*—Harold Joyce
*Attorney, Agent, or Firm*—Lalos & Keegan

[57] ABSTRACT

Method and apparatus for treating fruits including use of an air plenum above palletized boxes of fruit to force air through the plenum and to the front of the trailer containing the palletized fruit. The air in very high volume per minute is forced downwardly and drawn through the fruit to provide controlled temperature and humidity. A portion of the exhaust air is recirculated while maintaining high humidity of at least 75% and temperature difference between inlet and exhaust air of no greater than 5° F.

47 Claims, 5 Drawing Sheets

FOOD TREATING APPARATUS AND METHOD

BACKGROUND OF THE INVENTION

This invention relates generally to method and apparatus for treating fruits and particularly those fruits that are climacteric such as bananas, tomatoes, avocados, melons, pears, honeydews and the like.

More particularly the present invention relates to apparatus and method for treating such fruits that may include ripening these fruits while in typical ventilated boxes closely stacked together on pallets. More specifically the present invention relates to method and apparatus for treating fruits that are climacteric including ripening such fruits that are palletized in mobile trailers without requiring such fruits to be removed from the trailer to be placed in ripening rooms or require other labor intensive air stacking procedures to achieve conditioning of the fruit.

It has always been recognized in the prior art that fruits, particularly those that are climacteric, must have special treating conditions. These conditions control the temperature in order to determine the timing of the ripening process, or maintain these fruits in a controlled temperature environment that allows subsequent ripening of the fruit or marketing of the fruit to the consumer.

In the past, the fruits have been shipped in wooden crates having bowed sides, such as disclosed in U.S. Pat. No. 2,778,206 issued Jan. 22, 1957. These crates were packed close together and were always packed by hand. Attempting to closely pack these crates was an important element of the process in order to achieve the lowest transportation cost by maximizing the average weight per cubic unit of space in the transporter. The problem was always recognized in the art that cooling or, more precisely, precooling of the fruit after loading into the conveyance was important to quickly maintain the desired temperature. If precooling was not achieved, the onset of the initiation of ripening stage would occur and, as is true with the exothermic ripening processes of such fruits, the temperature burden would be beyond the typical trailer or other conveyance to cope with, resulting in a deteriorated or spoiled load of fruit that often would not be useable.

To avoid the prospect of premature ripening, the fruits were maintained at a temperature below the temperature that would cause the onset of the initiation of ripening. Oftentimes this required the crates to be stored in cooling rooms that required the crates to be air stacked, leaving ample space between each of the crates to allow circulation of cooling air, after which the crates were again handled individually to be stacked back into a mobile trailer or other conveyance. It is obvious that this method was extremely expensive because of the requirement of several handlings of the individual crates, and also the requirement for a cooling or refrigerating room of such enormous size and capacity that it would be capable of receiving a substantial number of these air stacked crates.

In more recent years, the fruits have been shipped from their country of origin packed in ventilated, corrugated board boxes in which the fruit is wrapped in plastic liners that have small openings throughout the plastic liner. The typical banana box, for instance, is ten inches high, sixteen inches wide and about thirty-two inches long and is stacked on a pallet eight boxes high.

It is important that the boxes containing the fruit are left on the pallets so as to avoid more handling than necessary. The pallets with the boxes of fruit are carried by forklift trucks, but the boxes must remain stacked in the five boxes per layer arrangement for each of the eight layers throughout any treatment or holding period.

As the palletized fruit leaves the country of origin, the pallets are usually placed in refrigerated containers that can be placed on the ship for transportation and then off loaded onto mobile trailers to be transported to the warehouses at which typically are found the ripening rooms that require manual "air stacking" of the boxes on the pallets with only five boxes per layer. This limit of boxes per layer is required in order to allow space in between individual boxes for air flow when the pallets with the boxes are in the typical ripening or cooling rooms. Withoug such spacing adequate air flow was not possible resulting in uneven ripening and poor quality fruit. Thereafter, ripening of these fruits is to occur in the same boxes.

The ripening process is always supposed to be accomplished in specially designed ripening rooms wherein the fruit is gassed in conventional manner with ethylene and the temperature controlled. Thereafter the boxes on the pallets are returned to the mobile trailer for transportation to distribution centers or retail outlets.

It has long been recognized that it is expensive to retain the intermediate stop at which the palletized fruit in the boxes is to be gassed in a ripening room because it requires off loading from the trailer to the ripening room and then onloading back to the trailer.

The obvious and most economical alternative is to effect the ripening of the fruit in the mobile trailer while being transported to the distributor or retailer, but the typical refrigerated mobile trailer is not adequate to handle the inherent temperature rise caused by the exothermic reaction of ripening should ripening be initiated in the mobile trailer as it is transported from shipside to an ultimate destination. It has been found to the great detriment of the fruit that the great heat output of the ripening process is more than any currently popular trailer is capable of dissipating. The temperature would rise inordinately under such uncontrolled conditions resulting in further escalation of the ripening process and ultimately a deterioration of the fruit.

As well known in the art the concept of initiating the ripening with ethylene is to achieve a uniformity of ripening that will bring the ripening process to a conclusion essentially simultaneously among fruits that may have progressed in the ripening cycle more than their adjacent or neighboring fruits. To achieve this process successfully and bring about uniform ripening, it is essential that the temperature be controlled during the initiation of ripening and the ripening process as well as thereafter. Uniformity of temperature of fruits such as bananas has been the basic requirement to achieve uniformity in ripening. To achieve this uniformity the prior art has always stacked the boxes of fruit with some spaces between the sides of adjacent boxes in order to allow air flow sufficient to carry off the heat from the ripening reaction. These spaces have necessitated that the boxes be stacked five to a single layer on the pallet in order that spaces exist between the adjacent sides. However, it is possible to have every pallet of standard size contain six boxes of identical size as those previously stacked five boxes to a layer and have each of these boxes be in mutual contact at the sides as well as the tops with adjacent boxes. While such an arrangement would obviously be more efficient, there never has been the capability in the art to provide necessary air flow for these closely packed palletized boxes to achieve uniformity of temperature and uniformity of ripening conditions.

To put into proper perspective the amount of heat that is given off by the exothermic reaction, in the past it has been recognized that a large volume of free space in any ripening room is required in order to transport the heat emitted from the ripening of the fruit. Before the palletized fruit such as bananas are admitted to the ripening rooms of the past the air in the ripening room is already at a low temperature so that upon being gassed with ethylene the ripening causes so much heat that unless the pallets were air stacked with substantial spaces between the boxes and the air circulated with large fans that the heat in the ripening room would not be kept under control. The ripening room, however, inasmuch as it is much larger than the volume of the fruit is capable of handling the exothermic ripening reaction. For mobile trailers and other refrigerated transportation means, wherein the boxes are stacked close to the ceiling to preserve and maintain economical transportation costs, the heat generated by the exothermic ripening reaction is simply far beyond the capability of the refrigeration means on the trailer or other conveyance to absorb resulting in damaged fruit that would be unsaleable.

In the U.S. Pat. No. 2,778,206 mentioned above, there is an attempt to meet some of the problems of the prior art particularly in treating fruits that were in crates, as distinguished from the currently used corrugated board boxes, and wherein the crates are packed as close together as possible, giving due allowance to bowed sides that necessarily produce air spaces for channelling air between the boxes. The patent discloses a treating apparatus for boxes of fruit that are packed into mobile trailers and includes a flexible snout that directs air out over the top of the fruit to direct air to the rear portion of the top of the trailer from which the air is shown to be directed downwardly through the spaces occurring between the boxes that are located particularly at the ends of the bowed side slats. It is through these spaces that the volume of chilled air passes through these spaces.

The patent also discloses that a substantial volume of air under pressure is forced out towards the front of the trailer from which it is expected to pass downwardly through these spaces created between the boxes. While uniformity of flow is mentioned, the fact is that uniformity of air flow would not be possible with the boxes placed close up to the front of the trailer. Air flow would not be able to pass down between the boxes in the front and the front of the trailer so as to have access to the fruit in the front portion of these leading boxes. The likely reason that a proper air flow was not as critical for the purposes of the patent was that in the patented apparatus no mention is made of the ripening cycle during which the great exothermic reaction would give off such heat that each of the individual fruits would have to be cooled to prevent damage to any of the individual fruits. Thus, to meet conditions other than ripening, the patented apparatus and method were sufficient.

The patent is believed to be the closest prior art known, but would not meet the requirements of treating the fruit during ripening, as is desired, or at other times successfully, because the air that is passed over the top of the boxes, while controlled to a desired temperature, would not have the proper humidity. The air flow of this patent is not recycled without cooling. Thus, air that passes through the chiller coils would necessarily remove much of this moisture producing low relative humidity air flow that when passed through to the top of the boxes would continually dehydrate the fruit.

The volume of air would also not be sufficient to assure the penetration of the air through the ventilated boxes and through the plastic perforated wrap currently in use unless there was substantially greater volume than is suggested in the patent. The patentee discloses no air space in front of the boxes between the front of the trailer and the first row of boxes to enable air to pass downwardly in front of the boxes in order to be sucked out through the boxes and into contact with the fruit. Additionally, there is no air vane or director or other means to assure that air flow does pass downwardly into the air space so that it can be drawn through the entire contents of the trailer from the front of the first box to the rear of the last box of fruit.

SUMMARY OF THE INVENTION

It is in accordance with the present invention that there is provided an apparatus and method for treating ventilated boxes of fruit that are stacked closely together on a pallet or otherwise stacked and an air plenum formed between the upper portion of the space between the top of the boxes and the ceiling to create a fruit treatment chamber below. The air plenum is preferably a long flexible plastic sheet or tube that extends substantially to the front end of the trailer to direct high volume inlet air flow to the front end wherein an air space is created between the front of the boxes and the front of the trailer in order that an air director is able to force the air downwardly into this air space and towards the bottom of the trailer so that the air will be able to pass through the ventilated boxes and the perforated plastic wrap for the fruit. The exhaust air that is withdrawn is within 5° F. of the inlet temperature and possesses high humidity. This exhaust air is partially returned to the air supply and into the air plenum on top of the boxes and only partially chilled or heated to meet the required environment temperature and humidity of at least 75% relative humidity. The recirculation of the air is designed to assure that the proper temperature and humidity conditions are maintained.

OBJECTS OF THE INVENTION

It is the principal object of the present invention to provide method and apparatus for the treatment of fruits particularly the climacteric fruits.

It is another object of the present invention to provide method and apparatus for treating fruits while ripening in mobile trailers and while palletized without necessitating rehandling of the palletized fruit into ripening rooms or precooling environments.

It is another object of the present invention to provide for an air plenum to receive air supply and direct air supply to the front of the trailer in which an air space is provided and direct the air flow downwardly towards the bottom of the trailer from which it can be sucked through each of the ventilated boxes and perforated plastic wrapper around the fruit to be recycled in part to maintain proper humidity and temperature.

It is a further object of the present invention to provide a boundary cushion sealing means that provides a seal between the open end of the mobile trailer and the fruit treating apparatus of the present invention.

It is a further object of the present invention to provide a method and apparatus for providing controlled environment temperature and humidity to provide treatment that may include ripening of these fruits in an economical and efficient manner.

THE DRAWINGS

DESCRIPTION OF THE PREFERRED EMBODIMENT

Figure 1:
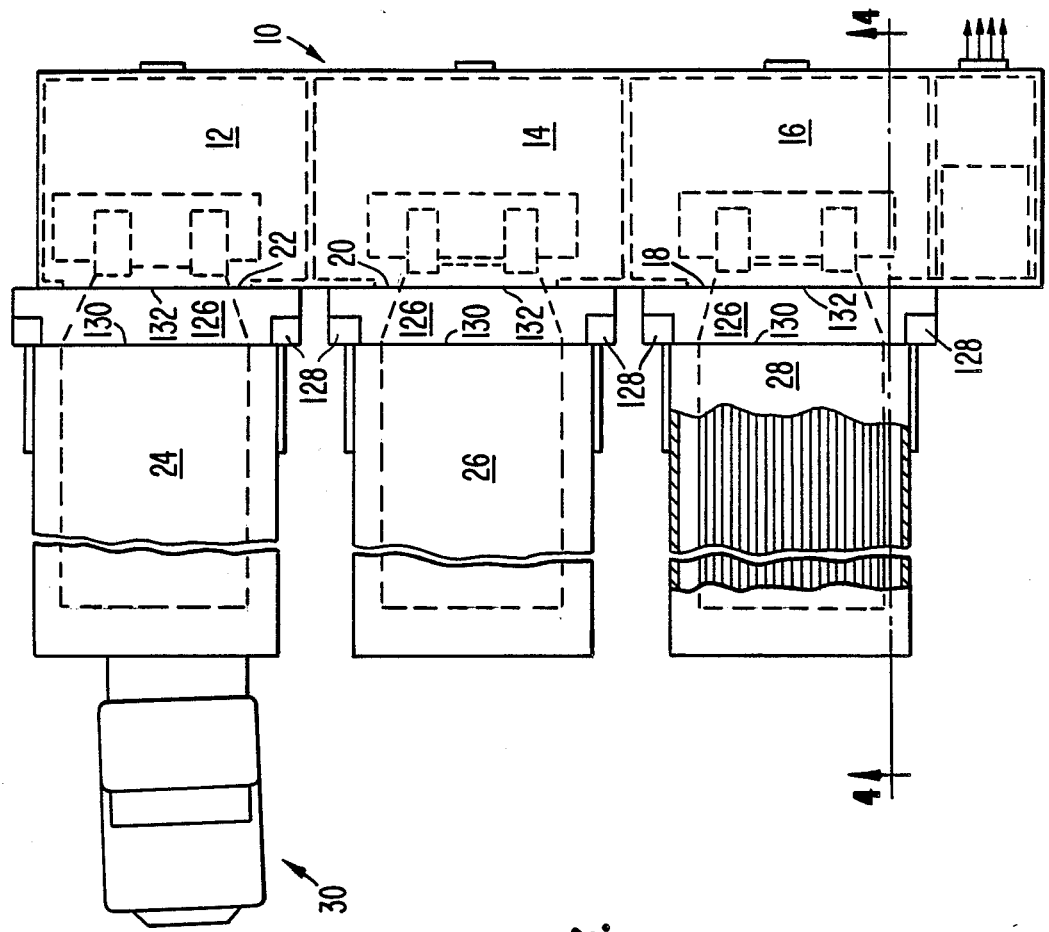
FIG. 1 is a schematic land view partly broken away illustrating a multi-unit of the mobile ripening trailers of the present invention that are backed up against the base unit providing the treating environment.

In the illustration of FIG. 1 there is disclosed the fruit treating housing assembly 10, which essentially includes three individual self-contained units 12, 14 and 16 that service in three open bays 18, 20 and 22 three individual mobile trailers 24, 26 and 28 for which a single tractor 30 is shown for unit 24.

Figure 2:
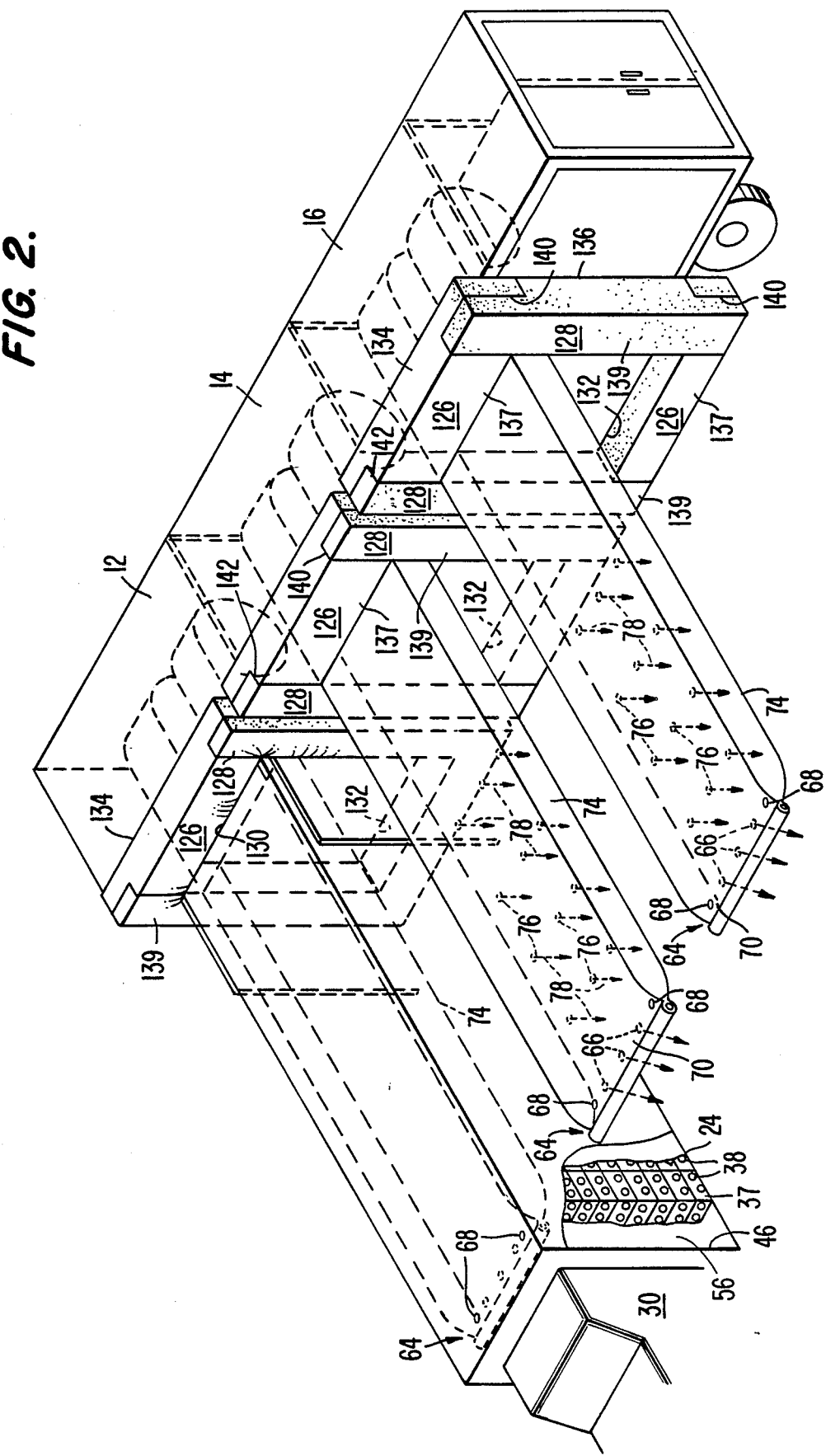
FIG. 2 is a perspective view of the apparatus shown in FIG. 1 wherein the tube for extension over the top of the boxes to form the air plenum is shown protruding from the fruit treating assembly.
Figure 4:
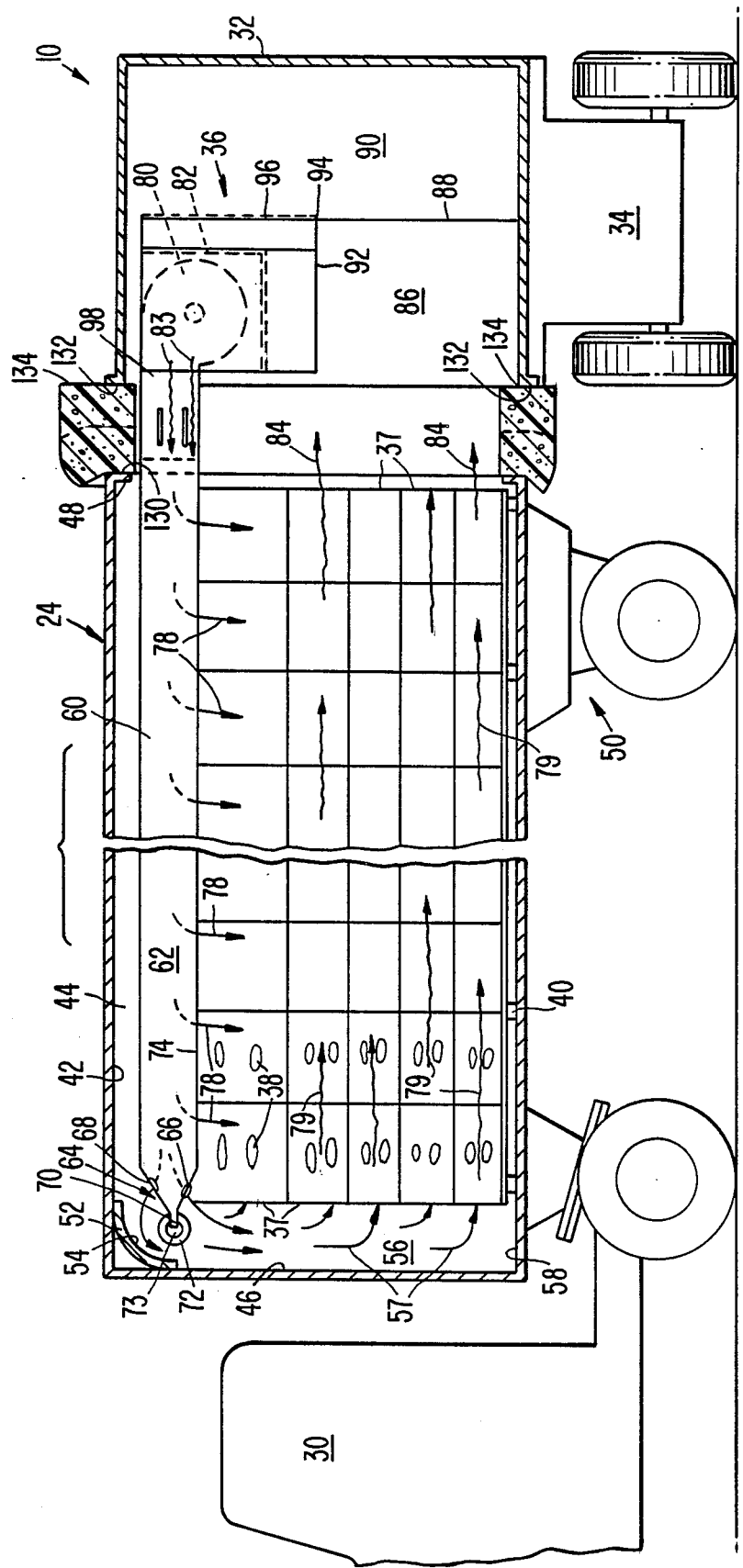
FIG. 4 is a side elevational view in cross section illustrating the palletized boxes of fruit positioned within the trailer upon which an air plenum is formed thereabove and also illustrating the air flow through the boxes.
Figure 5:
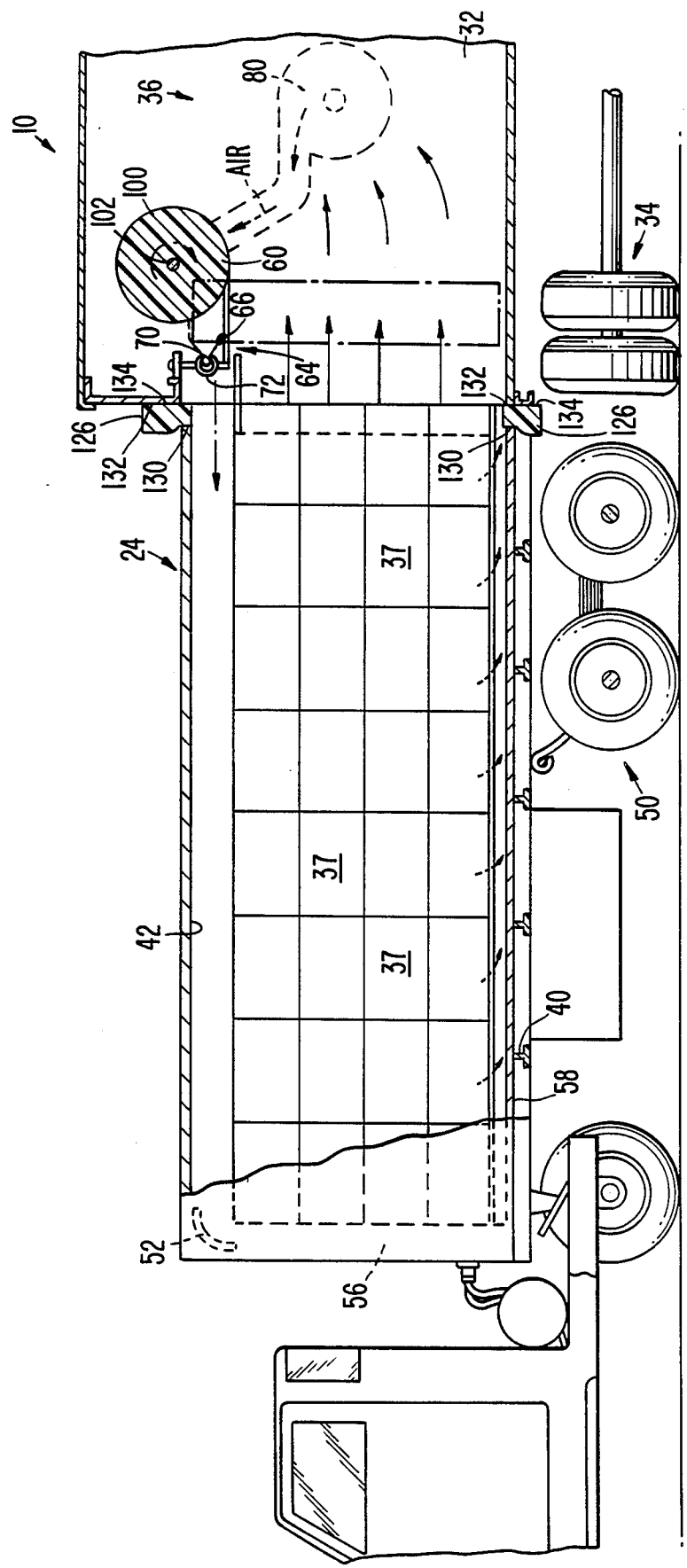
FIG. 5 is another view similar to FIG. 4 with the tube forming air plenum retracted.

While FIG. 2 illustrates the multiple use of the fruit treating housing assembly of the present invention when taken together with FIGS. 4 and 5 directed to a single trailer 24, the invention will be clear and more readily understood. In FIG. 4 particularly, the fruit treating housing assembly 10 includes a housing 32 that may sit on a suitable mobile chassis 34 and in which is mounted the air supply apparatus 36 for providing humidity and temperature control that will be discussed and described subsequently.

In the trailer 24, there are a plurality of ventilated corrugated board boxes 37, each of which has a plurality of ventilation openings 38 positioned on all sides and on the top of the boxes 37. Inside each box, but not illustrated, is the typical plastic wrap that itself has openings for the passage of air. The plastic wrap is wrapped around the fruit before it is closed up in each of the boxes, all in the conventional manner. The boxes are shown stacked closely together and would in actual practice of the present invention be stacked eight high and six to each layer on the pallet 40.

It should be noted that in accordance with the present invention it is possible to put these boxes six to each layer on the pallet stacked eight layers high as compared to prior art air stacking that permitted a maximum of five boxes per layer. Thus in the same volume 20 percent more fruit can be treated in accordance with the present invention as compared to prior methods, simply by reason of stacking the boxes much closer together. Even though they are tightly packed with no air spaces between the sides of the boxes the fruit will be uniformly treated according to the present invention.

The pallets are transported usually by forklift truck into the trailer such as 24 having a ceiling 42, sides 44 and a front end 46 as well as a rear end portion 48. The trailer 24 is made mobile by a mobile chassis 50 of conventional construction that may be similar to the mobile chassis 34. As best shown in FIG. 4, at or near the junction of the ceiling 42 and the front wall 46 there is provided an air deflector in the form of a vane 52 that preferably extends the full width of the front end 46. The vane 52 is concave shaped towards the rear end of the trailer 24 so as to direct air flow that impinges on the concave surface 54 in a downwardly direction.

As best shown in FIG. 4, the longitudinal extent of the boxes 37 on the pallets 40 into the trailer is such as to leave an air space 56 between the leading edges of the boxes 37 and the surface of the front end wall 46 of the trailer 24. This air space is an important element of the present invention in that it allows air to pass between the boxes and the surface of the front end 46 towards the bottom 58 of the trailer 24. On the way towards the bottom and while in the air space 56, the air, as shown by the arrows in the air space 56 as shown in FIG. 4, passes through the ventilated openings 38 on the front of the boxes so as to pass through the boxes and through the perforated film that covers the fruit. The air flow proceeds all the way to the rear end 48 of the trailer 24.

In order to achieve the air flow into the air space 56 and through the boxes it is important that there be supplied sufficient air flow and sufficient volume towards the front of the trailer. In order to achieve this end the present invention includes a tube 60 of flexible material such as that of polypropylene or other thin film material. As best shown in FIG. 2, the tube 60 is elongated and extends substantially between the sides 44 from the rear end 48 up towards the front end 46. This tube is hollow and forms an air plenum 62 within the tube 60 for the transportation of the air flow out towards the front end of the trailer. The tube 60 is shown in its extended state in FIG. 4 and in a retracted position in FIG. 5. When in the extended position of FIG. 4, the extended front end 64 of the tube 60 is positioned closely adjacent to the front end wall 46 and, as shown in FIG. 2 and in FIG. 4, there is provided a plurality of openings 66 at the front end 64 of the tube 60. These openings 66 aid in directing the air downwardly towards the air space 56 by reason of their position on the underside of the tube 60 as best shown in FIG. 4. In addition to openings 66, additional openings 68 are provided in the upper portion of the end 64 of the tube 60 as shown in FIGS. 2 and 4. These openings 68 at the upper portion of the end 64 permit air in the tube 60 to be directed outwardly towards the vane 52, and ultimately to be directed downwardly into the air space 56 and thereafter through the ventilated boxes 37.

At the farthest end 70 of the tube 60 the plastic sheet material is sealed or welded together in any conventional manner to allow an elongated slit tube 72 to be secured over the end 70. The interior 73 of the tube allows winding the tube up, after it has been protracted, through the insertion of a core or pole, not shown, to produce the retracted position, as shown in FIG. 5, and so be ready to be extended by reason of subsequent air flow out again to the position of the tube shown in FIG. 4. As best shown in FIG. 2, the tube 60 is provided with a flat lower wall 74 in which there is positioned a plurality of holes 76 in order to provide air flow from the interior of the air plenum 62 to the top of the boxes 37 as shown by the air direction arrows 78 in both FIGS. 2 and 4.

The purpose of the holes 76 is to provide the air flow as shown by 78 onto the top of the boxes 37, which have the ventilated openings 38, to receive this air flow. The flow of this additional air 78 onto the top of the boxes adds to the primary air flow 79 through the boxes that emanates from the downward flow 57 into the air space 56 and through the first tier of boxes 37 and thereafter through to the last box of fruit at the end 48 of the trailer 24.

Shown schematically in FIG. 4 and in FIG. 5 is the air supply system 36 that includes conventional blower 80 and conventional cooling means 82 that may also include conventional heating means to condition the air to the temperature desired. The cooling/heating means 82 along with the blower 80 are conventional, as stated, although the capacity of the blower is such that it is capable of blowing out into the tube 60 an air flow 83 of at least 18,000 cubic feet per minute and may require at least a five horsepower electric motor, not shown, to move the blower. The air flow can be much greater if desired and is limited only by the pressure that can be safely exerted on the trailer 24, the boxes 37 and the contained fruit. 20,000–30,000 cubic feet per minute air flow or more could be used.

As shown in FIG. 4, the air is sucked out of the boxes 37, as shown by the arrows at 84, into an exhaust chamber 86 formed in part by impervious exhaust chamber wall 88 that isolates the air supply 36 from the remainder of the housing 32. There is formed in housing 32 a side by side complementary chamber 90 open to the atmosphere but separated from exhaust chamber 86. Slide valve 92 with operating handle 94 controls the amount of exhausted high humidity and higher temperature air that is admitted directly to the blower for recirculation without additional heating or cooling. The temperature of this exhaust air 84 is not more than 5° F., preferably 3° F. and optimally 2° F. higher than the inlet air flow 83.

Similar valve means at 96 that may be in the form of conventional louvers controls the amount of environment air admitted to the blower 80 from chamber 90 in a conventional manner. As can be seen by moving the valve operating handle 94 out towards the open chamber 90, the valve 92 will admit more of the higher temperature humid air from the exhaust chamber 86 into the blower without having such air pass over the heating or cooling means 82. The louvers 96 will control the amount of air from open chamber 90 admitted through the cooler and heater means 82 so that the air that is passed out from the blower to form inlet air flow 83 constitutes the air flow that is blown in high volume under pressure into the tube 60.

When the tube 60 is in retracted position, as shown in FIG. 5, the air flow is so great that the tube will be extended out over the top of the boxes and it unravels quickly to allow air flow out of openings 66 and 68 into the air space 56 and through boxes 37 to be partially recycled through exhaust chamber 86.

The structure shown in FIG. 5 is a slightly different schematic for the retracted tube as it is in a retraction housing 100 that does not utilize the slit tube 72 for retraction but rather has its own core winding means shown at 102.

The experience with the present invention is that the tube is of such thin flexible plastic film material that when wound around the core or pole inserted in the slit tube 72 that the rolled up diameter of the tube will be capable of fitting well within the area between the top of the boxes and the ceiling 42. But, in the embodiment of FIG. 5, the rollup is mechanical and wound around the core winding means 102 in a conventional manner. The important point, however, is that upon the operation of the blower 80 the massive volume of air flow 83 is so great as to extend the tube 60 out to its limit so as to form the air plenum 62 and to distribute the air flow in the manner previously described.

Figure 6:
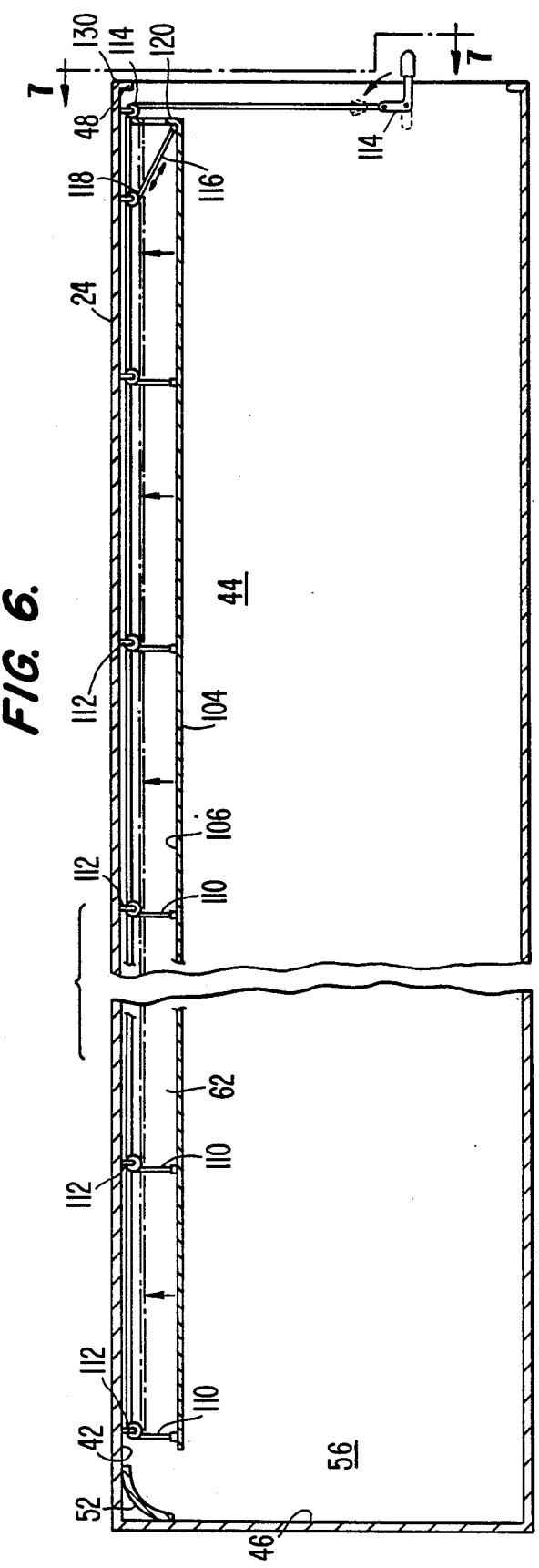
FIG. 6 is a side elevational view partly broken away of a modified form of the present invention wherein the air plenum is formed by sheet material secured to the sides of the trailer.
Figure 8:
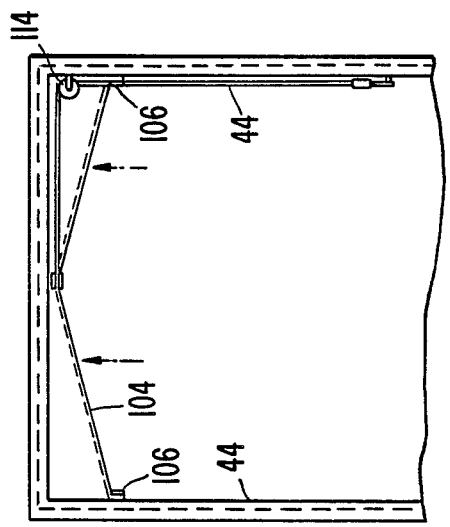
FIG. 8 is a cross sectional view partly broken away and similar to that of FIG. 7 but showing the raising of the sheet material forming air plenum.
Figure 7:
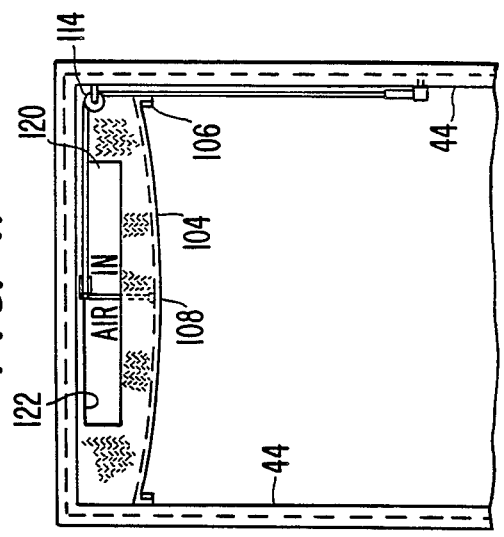
FIG. 7 is a cross sectional view partly broken away taken along lines 7—7 of FIG. 6 in which the air inlet is illustrated.

In the embodiments of FIGS. 6, 7 and 8, there is a different form of a means to provide the air plenum. As shown in each of these figures, the plenum on top of boxes is formed within trailer 24 and has the same sizes and descriptions as previously set forth, but has instead of the extendable tube 60, a thin sheet-like material 104 that extends from the rear end 48 of the trailer 24 and is attached by any suitable means such as strips 106 secured to the sides 44,44 of the trailer extending outwardly towards the front end of the trailer near the front wall 46. The positioning of the sheet material 104 still allows for a space such as air space 56 similar to that previously described. Also vane 52 directs air from the plenum 62 formed between the ceiling 42 and the surface of the sheet material 104 in the same manner as previously described. Suitable holes not shown may be positioned in the lower flat wall 106 if desired for the same reason as previously described.

To enable the pallet 40 of boxes 37 of fruit to be loaded onto the trailer, the sag in the sheet material must be raised from the position in FIG. 7 to that of FIG. 8. In order to accomplish this a system of pulleys and ropes is utilized.

As best shown in FIGS. 6, 7 and 8 the bowed portion or sag 108 of the sheet material extends downwardly to which is attached, at a plurality of locations along the longitudinal length of the sheet material, a plurality of cords 110 that are reeved through a plurality of pulleys 112 secured to the ceiling 42. Upon operation of the controlling bell crank handle 114, the pulleys with the cords operate to raise the bowed portion from the position of FIG. 7 to that shown in FIG. 8. At the same time an additional cord 116 is reeved through a pulley 118 and controls a faceplate 120 that includes an air inlet 122 for the air flow 83.

The faceplate upon operation of the bell crank is pulled by the cord 116 in the direction towards the front of the trailer and is raised above the position shown in FIG. 6 to that of FIG. 8 where the faceplate is pivoted upwardly to the position behind the rear end 48 thus to allow the pallets with the fruit to be transported in or out of the trailer. The air inlet 122 is positioned so as to receive the end of the blower and provide the air flow 83 into the air plenum formed between the sheet material and the ceiling.

Figure 3:
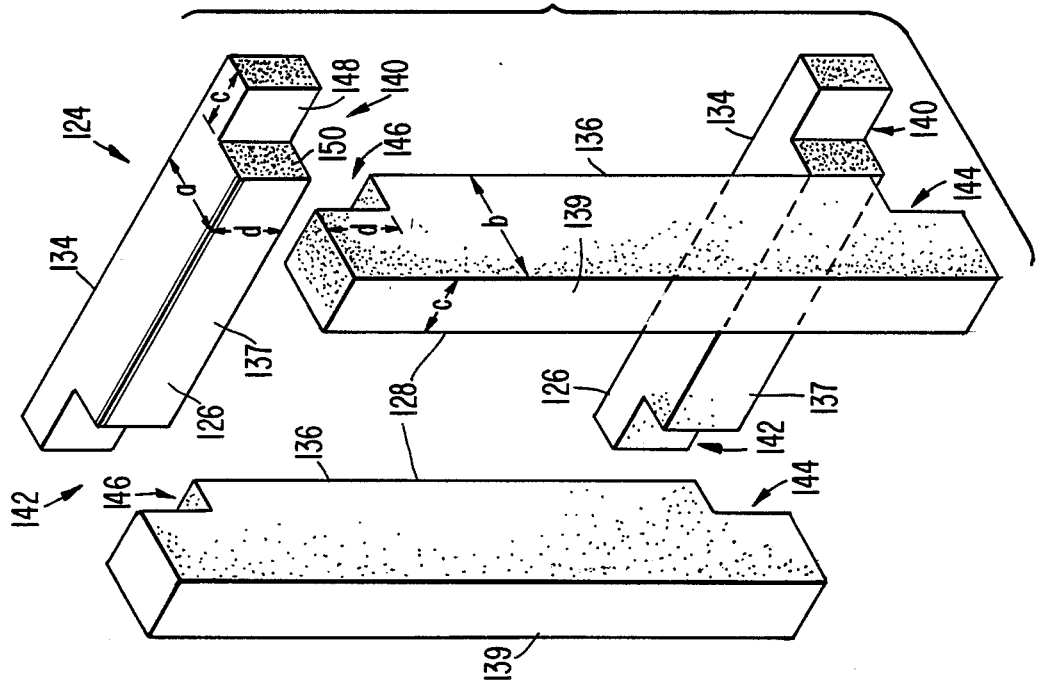
FIG. 3 is a perspective view of the boundary sealing cushions shown in FIG. 2 that provide a seal between the open end of the trailer and the fruit treating apparatus.

Another aspect of the present invention is shown in FIGS. 2, 3, 4 and 5 in the form of a bumper cushion assembly 124. As best shown in FIG. 3 the bumper cushions or bumpers are formed in identical pairs, the upper and lower pairs of bumper 126,126 and the vertical or side pairs of bumpers 128,128. The purpose of these bumpers is to fit, as shown in FIGS. 2 and 4, snugly against boundary of the opening 130 at the end of the trailer and the boundary surface 132 at the opening of the fruit treating housing assembly.

The vertical facing surfaces 134 on the upper and lower bumpers 126 and the corresponding surfaces 136 on the vertical bumpers 128 are in contact with the edge or boundary of the opening 132 of the fruit treating assembly 10 while the surfaces 137 on the upper and lower bumpers 134 and the surfaces 139 on the vertical bumpers 136 are in contact with the mobile trailer 24 at the surface 130 when the trailer backs into the opening of the fruit treating apparatus 10. As shown best in FIG. 3, each of these bumpers 126,126 has a pair of outwardly facing notches 140 and 142 when positioned as the upper and lower bumpers against the opening 132 of the fruit treating assembly 10. Similarly each of the vertical or side bumpers 128 have pairs of notches 144 and 146 that are complementary to and overlap the notches 140 and 142 of the bumpers 126 and 126. In each of the notches, whether on the vertical or side bumpers 128 or the upper and lower bumpers 126 the notches have transversely positioned faces 148, 150 and are about one-half the depth a of the upper and lower bumpers 126 and about half the depth b of the vertical or side bumpers 128. Similarly the width of the notch c in bumpers 126,126 is the same as the width of the vertical bumpers 128 and the vertical height of each notch d is exactly the same as the height of the bumpers 126. This is true for each of the notches so that there is a clear complementary fit between one notch on the horizontal bumper 126 with the corresponding notch on the vertical bumper 128. The faces 148, 150 of complementary notches are of essentially equal area.

The bumpers are composed of any resilient or flexible material typically used for cushions such as polyurethane, polyethylene or polyvinyl, other plastics and also rubber latex. The outer coating of the foam interior should be a tough relatively thick, durable sheet material such as polypropylene, polyvinyl chloride, polystyrene, polyethylene or a polyester or any one of a number of materials that would produce tough abrasion-resistant covering for the underlying foam.

When the bumpers are in place, it can be seen in FIGS. 4 and 5 for instance, that as the trailer 24 is backed into position, the cushions forming the bumper assembly 124 are distorted around the boundaries 130 and 132 so as to form an airtight seal at these respective boundaries between the fruit treating housing assembly 10 and the trailer 24.

In use the present invention is capable of cooling rapidly to draw off the field heat from any of the fruits such as tomatoes, bananas, avocados, melons, pears, honeydews, as well as any of the other climacteric produce. The temperature control and the air flow recirculation systems provide for maintaining the proper humidity and temperature throughout the palletized fruit resulting in uniform ripening upon being gassed with ethylene in accordance with conventional procedures. The temperature and humidity controls allow the initiation of ripening to be maintained in accordance with desired marketing conditions.

It is a particular advantage that a number of individual trailers may be treated as shown in FIG. 1 by having them back up against a multiple fruit treating housing assembly that includes individual units such as those identified as 12, 14 and 16 in FIG. 1. While the illustration in FIG. 1 shows only three trailers, 24, 26 and 28 on the left side of the fruit treating housing apparatus 10, it is also possible to have three or more trailers on the right hand side provided there are additional cooling and blowing apparatus positioned on the right hand side that would use the cooling/heating and blowing apparatus on the left hand side of the housing assembly 10.

It has been found that it is desirable to retain the incoming air flow 83 within 5° F., preferably 3° F. and optimally 2° F. of the exhaust air 84. The desirable approach to attaining such a small difference in the temperature of the inlet air flow and the exhaust air flow after it has passed through the fruit is to have a massive volume of air. At least 18,000 cubic feet per minute air flow is desired in order to maintain these very small differences in the temperature of the inlet air and the exhaust air. By having such great volumes of air and such a high air flow, the uniformity of the temperature of the pulp of the fruit is assured.

In accordance with the present invention, it has been found that the humidity in terms of Relative Humidity of the inlet air should in its broadest aspects be about 75 - 95 percent or greater Relative Humidity while it is preferable that the Relative Humidity be maintained at a level of at least 85 percent Relative Humidity. The purpose of this high humidity is to prevent an undesirable dehydration of the fruit. The dehydration of the fruit is a common occurrence in the past where cool air was circulated into any compartment of boxed fruit because the air when cooled loses moisture as it is drawn over the refrigeration coils. This air typically was so dehydrated and low in relative humidity that the fruit would prematurely dry and be severely damaged. In contrast, in accordance with the present invention the humidity is maintained high by reason of recirculation of the exhaust air of at least 20 - 60 percent of the air so exhausted and being recirculated without passing through the temperature control coils such as 82 and thus not having the moisture removed therefrom.

Additional air from the atmosphere and chamber 90 would be cooler and would be somewhat dehydrated as it passed over the cooling coils 82. This air is mixed with the slightly higher temperature, and much higher relative humidity air being exhausted at 84, the total air flow 83 coming from the blower forming the air flow into the trailer would have a controlled temperature suitable to meet the requirements of either holding the fruit or initiating ripening for maintaining an acceptable ripening temperature in accordance with the characteristics of the fruit. The control of the amount of recirculation of the air 84 is simply through the valve 92 that when opened more will allow greater volume of the exhausted air 84 to enter into the blower to form the air flow 83 into the trailer.

It is believed that the foregoing description of the invention clearly should attain the objects of the present invention, which should be limited solely by the appended claims, wherein we claim:

We claim:

1. Fruit treating housing assembly for receiving ventilating boxes of fruit to be treated with controlled temperature and humidity comprising, a housing having front and rear ends, a ceiling, a bottom and sides, a free space area located in front of and in contact with the front of said boxes forming an air space, an air plenum formed independent of the top of said boxes within the upper portion of the space between the top of the boxes, the ceiling and the sides and creating a fruit treatment chamber below, said air plenum extending from one side of the housing to the other and extending from the rear of the housing toward the front thereof and terminating at approximately the boxes located at the front of the housing, said air plenum having an air inlet at the rear of said housing for fluid communication with an air intake and an air outlet end toward said front end to supply air flow to said front end, air director means positioned within said housing assembly towards said front end to receive the air flow from said air outlet for direction downwardly along the front end below the top of the boxes and along the air space in front of the boxes towards the bottom of said housing assembly, air supply means in fluid communication with said air inlet to provide high air flow of controlled temperature and humidity, air return means to draw air primarily from said front end in front of and below the top of the boxes in a horizontal direction to penetrate through each of said ventilated boxes of fruit to the rear of said housing to form return air the combination of the free air space area forming the air space, the air plenum, the air director means as well as the air supply means and air return means all providing the means producing the horizontally directed air flow, and recirculation means for selectively combining a desired proportion of said return air to said air supply means whereby to affect humidity and temperature of said flow of air to said air inlet.

2. The assembly of claim 1 including,
said air plenum having a lower wall formed of flexible material and having sides secured to the sides of the housing.

3. The assembly of claim 2 including,
height adjusting means to raise and lower the height of said air plenum over the top of said ventilated boxes.

4. The assembly of claim 3 including,
said height adjusting means including means attached to said lower wall to raise said lower wall.

5. The assembly of claim 1 including,
said air plenum being formed as a flexible extensible tube.

6. The assembly of claim 5 including,
said air director means having openings at an extended end to direct air flow within said plenum downwardly into said air space between the front of said boxes and the front of said housing.

7. The assembly of claim 6 including,
said tube having a core holder positioned at the end of the tube to receive a core for winding up said tube.

8. The assembly of claim 6 including,
said tube having said openings directed downwardly into said air space.

9. The assembly of claim 6 including,
said tube having a flat lower wall and a plurality of holes provided in said lower wall to allow air flow onto the top of the boxes.

10. The assembly of claim 6 including,
said tube having a core holder positioned at the end of the tube to receive a core for winding up said tube, and said tube having said openings directed downwardly into said air space.

11. The assembly of claim 6 including,
said tube having a core holder positioned at the end of the tube to receive a core for winding up said tube, and said tube having a flat lower wall and a plurality of holes provided in said lower wall to allow air flow onto the top of the boxes.

12. The assembly of claim 6 including,
said tube having a core holder positioned at the end of the tube to receive a core for winding up said tube, said tube having said openings directed downwardly into said air space, and said tube having a flat lower wall and a plurality of holes provided in said lower wall to allow air flow onto the top of the boxes.

13. The assembly of claim 1 including,
said air plenum having a lower wall formed of flexible material and having sides secured to the sides of the housing, and height adjusting means to raise and lower the height of said air plenum over the top of said ventilated boxes.

14. The assembly of claim 1 including,
said air plenum having a lower wall formed of flexible material and having sides secured to the sides of the housing, height adjusting means to raise and lower the height of said air plenum over the top of said ventilated boxes, and said height adjusting means including means attached to said lower wall to raise said lower wall.

15. The assembly of claim 1 including,
a second air director means positioned within said housing assembly including a vane positioned within the angle formed by the front end and ceiling of the housing to deflect air flow from said air plenum downwardly.

16. The assembly of claim 5 including,
said air director means having openings at an extended end to direct air flow within said plenum downwardly into said air space between the front of said boxes and the front of said housing, and a second air director means positioned within said housing assembly including a vane positioned within the angle formed by the front end and ceiling of the housing to deflect air flow from said air plenum downwardly.

17. The assembly of claim 5 including,
said air director means having openings at an extended end to direct air flow within said plenum downwardly into said air space between the front of said boxes and the front of said housing, a second air director means including a vane positioned within the angle formed by the front end and ceiling of the housing to deflect air flow from said air plenum downwardly, and said tube having said openings directed downwardly into said air space.

18. The assembly of claim 5 including,
said tube having a flat lower wall and a plurality of holes provided in said lower wall to allow air flow onto the top of the boxes, said air director means having openings at an extended end to direct air flow within said plenum downwardly into said air space between the front of a second boxes and the front of said housing, and a second air director means including a vane positioned within the angle formed by the front end and ceiling of the housing to deflect air flow from said air plenum downwardly.

19. The assembly of claim 1 including,
said recirculation means being sufficient to recirculate at least 20% by volume of said return air.

20. The assembly of claim 19 including,
said recirculation means being sufficient to recirculate at least 20-60% by volume of said return air.

21. The assembly of claim 1 including,
said recirculation means including a valve to control the amount of return air recirculated back to said air supply means.

22. The assembly of claim 1 including,
said air plenum being formed as a flexible extensible tube,
said air director means having openings at an extended end to direct air flow within said plenum downwardly into said air space between the front of said boxes and the front of said housing,
a second air director means including a vane positioned within the angle formed by the front end and ceiling of the housing to deflect air flow from said air plenum downwardly,
said tube having said openings directed downwardly into said air space, and
said recirculation means including a valve to control the amount of return air recirculated back to said air supply means.

23. The assembly of claim 1 including,
said air plenum being formed as a flexible extensible tube,
said tube having a flat lower wall and a plurality of holes provided in said lower wall to allow air flow onto the top of the boxes,
said air director means having openings at an extended end to direct air flow within said plenum downwardly into said air space between the front of said boxes and the front of said housing, and
a second air director means including a vane positioned within the angle formed by the front end and ceiling of the housing to deflect air flow from said air plenum downwardly.

24. The assembly of claim 5 including,
said tube having a flat lower wall and a plurality of holes provided in said lower wall to allow air flow onto the top of the boxes,
said air director means having openings at an extended end to direct air flow within said plenum downwardly into said air space between the front of said boxes and the front of said housing, and
said air space formed between said front end and said boxes extending from the top of said boxes to the bottom of said housing assembly and being of sufficient volume to permit the air flow from said air outlet of said air plenum.

25. A method of treating fruit in ventilated stacked boxes within a housing having a front, rear, ceiling and sides with controlled temperature and humidity conditions comprising,
forming a separate air plenum independent of the top of the boxes and within the space between the top of the boxes and the ceiling, and air plenum extending from one side of the housing to the other and extending from the rear of the housing toward the front thereof and terminating at approximately the boxes located at the front of the housing,
forming an air space between the boxes and the front of the housing that extends substantially at least the height of said boxes,
introducing high air flow into said air plenum at the rear of said housing above said boxes and thereafter out of said air plenum toward the front of said housing,
drawing said air flow substantially from said air space, in a horizontal direction through said boxes and into contact with said fruit and out from the rear of said housing to form return air, and
conditioning said air flow into said air plenum in part by recycling at least a portion of said return air into said air flow to attain a desirable environment for said fruit.

26. The method of claim 25 including,
directing said air flow downwardly into said air space.

27. The method of claim 25 including, maintaining the temperature differential between the air flow into the air plenum and the return air at about 5° F.

28. The method of claim 25 including,
recycling at least 20% by volume of said return air into said air plenum to provide additional moisture.

29. The method of claim 25 including,
directing said air flow downwardly into said air space, and
maintaining the temperature differential between the air flow into the air plenum and the return air at about 5° F.

30. The method of claim 25 including,
maintaining the temperature differential between the air flow into the air plenum and the return air at about 5° F., and
recycling at least 20% by volume of said return air into said air plenum to provide additional moisture.

31. The method of claim 25 including,
directing said air flow downwardly into said air space,
maintaining the temperature differential between the air flow into the air plenum and the return air at about 5° F., and
recycling at least 20% by volume of said return air into said air plenum to provide additional moisture.

32. The method of claim 25 including,
said high air flow being at least 18,000 ft$^3$/min.

33. The method of claim 28 including,
said recycling being between 20%-60% by volume.

34. The method of claim 25 including,
said air space between said boxes and the front being at least 4 inches.

35. The method of claim 25 including,
said air space between said boxes and the front being between about 4-24 inches.

36. The method of claim 25 including,
stacking said boxes closely together side by side and in superposed positions.

37. The method of claim 25 including,
maintaining said front at a substantially uniform temperature.

38. The method of claim 25 including,
maintaining the temperature differential between the air flow into said air plenum and the return air at about 2-3° F.

39. The method of claim 25 including,
maintaining the relative humidity of said air flow into said air plenum at 75-95% R.H.

40. The method of claim 25 including,
maintaining the relative humidity of said air flow into said air plenum at least at 85% R.H.

41. The method of claim 25 including,
maintaining the temperature differential between the air flow into the air plenum and the return air at about 5° F., and
recycling at least 20% by volume of said return air into said air plenum to provide additional moisture.

42. The method of claim 25 including,
maintaining the temperature differential between the air flow into the air plenum and the return air at about 5° F., and
said high air flow being at least 18,000 ft$^3$/min.

43. The method of claim 25 including,
maintaining the temperature differential between the air flow into the air plenum and the return air at about 5° F.,
recycling at least 20% by volume of said return air into said air plenum to provide additional moisture, and
said high air flow being at least 18,000 ft$^3$/min.

44. The method of claim 25 including,
maintaining the temperature differential between the air the return air at about 5° F.,
recycling at least 20% by volume of said return air into said air plenum to provide additional moisture, and
maintaining the relative humidity of said air flow into said air plenum at 75-95% R.H.

45. The method of claim 25 including,
said air space between said boxes and the front being at least 4 inches,
maintaining the temperature differential between the air flow into the air plenum and the return air at about 5° F.,
recycling at least 20% by volume of said return air into said air plenum to provide additional moisture, and
said high air flow being at least 18,000 ft$^3$/min.

46. The method of claim 25 including,
maintaining the temperature differential between the air flow into the air plenum and the return air at about 5° F.,
recycling at least 20% by volume of said return air into said air plenum to provide additional moisture,
said high air flow being at least 18,000 ft$^3$/min, and
said air space between said boxes and the front being between about 4-24 inches.

47. The method of claim 25 including,
maintaining the temperature differential between the air flow into the air plenum and the return air at about 5° F.,
recycling at least 20% by volume of said return air into said air plenum to provide additional moisture,
said high air flow being at least 18,000 ft$^3$/min,
said air space between said boxes and the front being between about 4-24 inches, and
stacking said boxes closely together side by side and in superposed positions.

* * * * *